United States Patent

[11] 3,581,041

| [72] | Inventor | Glenn F. Balfanz, Jr.<br>3912 Hampton Ave., Western Springs, Ill. 60558 |
|---|---|---|
| [21] | Appl. No. | 811,496 |
| [22] | Filed | Mar. 28, 1969 |
| [45] | Patented | May 25, 1971 |

[54] WELD BOX FOR TUBE FORMING MILL
10 Claims, 5 Drawing Figs.

| [52] | U.S. Cl. | 219/60 |
|---|---|---|
| [51] | Int. Cl. | B23k 9/02 |
| [50] | Field of Search | 219/59, 60, 61, 67, 8.5 |

[56] References Cited
UNITED STATES PATENTS

| 1,996,775 | 4/1935 | Sims | 219/61 |
|---|---|---|---|
| 2,151,989 | 3/1939 | Quarnstrom | 219/59 |
| 2,179,176 | 11/1939 | Dunn | 219/60 |
| 3,360,177 | 12/1967 | Enkvist | 219/59 |
| 3,393,286 | 7/1968 | Zandstra | 219/59 |

Primary Examiner—J. V. Truhe
Assistant Examiner—R. Skudy
Attorney—John J. Kowalik ABSTRACT: A weld box having laterally spaced walls with inlet and outlet ports through which a tube to be welded passes, preweld and postweld rollers mounted in the box and adjustable with respect to the welding rod to hold the tube accurately aligned with the rod and prevent the tube from twisting, the rollers rotatable on bearings which are isolated electrically from the rollers to prevent their destruction, the box provided with an inert gas diffuser which is located beneath the weld area and the inlet and outlet having gas outlets to protect the tube from atmospheric contaminants upon entering and exiting the weld box. The box has a tube cooling chamber and a spray trough to cool the tube when it exits the weld box.

Inventor
Glenn F. Balfanz, Jr.

By John J. Kowalik
Attorney

Inventor
Glenn F. Balfanz, Jr.

By John J. Kowalik
Attorney

WELD BOX FOR TUBE FORMING MILL

DISCUSSION OF THE PRIOR ART

Welded tubing, such as particularly used for hypodermic needles and the like, is constructed of a rectangular strip of thin metal which is formed into a cylinder with a longitudinal gap and welded along this gap to form a longitudinally welded seam. The welding of such seam is accomplished in a weld box in a controlled atmosphere in order to eliminate scaling and to control the amount of inert gas which is designed to continuously purge the atmosphere. However, in such devices difficulty has been experienced in preventing twisting of the tube either before, during or after welding. Difficulty has been experienced in preventing the tube from warping. Furthermore, the electrical charges have been grounding through the bearings of the guide wheels and eroding them whereby the wheels do not rotate and hold the tube properly. Another problem arising in such prior art weld boxes is in the control of the purging atmosphere and in the control of the temperature in the weld box to permit the weld to solidify without entrapping gases in the weld.

A general object of the invention is to provide a novel weld box comprising upper and lower portions which embrace a pair of preweld mounting blocks and another pair of postweld mounting blocks, each block being adjustable horizontally and mounting a tube-engaging roller which is vertically adjustable whereby the rollers are accurately adjustable to compensate for any twist on the tube developed by the mill and to hold the tube with its weld gap in accurate relation to the welding rod extending into the weld box.

A further object is to provide a weld box wherein the inert gas is introduced into the weld box through ports positioned in close proximity to the area of weldment in order to purge the atmosphere about the weld arc, the gas being exhausted along the tube through the inlet port to insure an adequate supply of inert gas about the tube at time of welding.

Another object is to provide a novel weld box comprising a casing having cooling passages arranged to maintain the box at optimum operating temperatures without distorting the box or unduly cooling the tube to be welded.

A still further object is the provide a novel weld box in which a heat exchanger is provided downstream of the box to which the inert gases are drifted and in which the temperature of the tube is lowered below the oxidizing temperature to prevent scaling.

A different object is to provide novel ground connections for the guide rollers to prevent electrical current from shunting through the bearings.

The invention comprehends a novel arrangement for spraying the tube after it exits from the heat exchanger to augment the action of the heat exchanger and to bring the temperature to a working level. These and other objects of the invention will become more readily apparent from the specification and the drawings, wherein.

DESCRIPTION OF THE INVENTION

Figure 1:
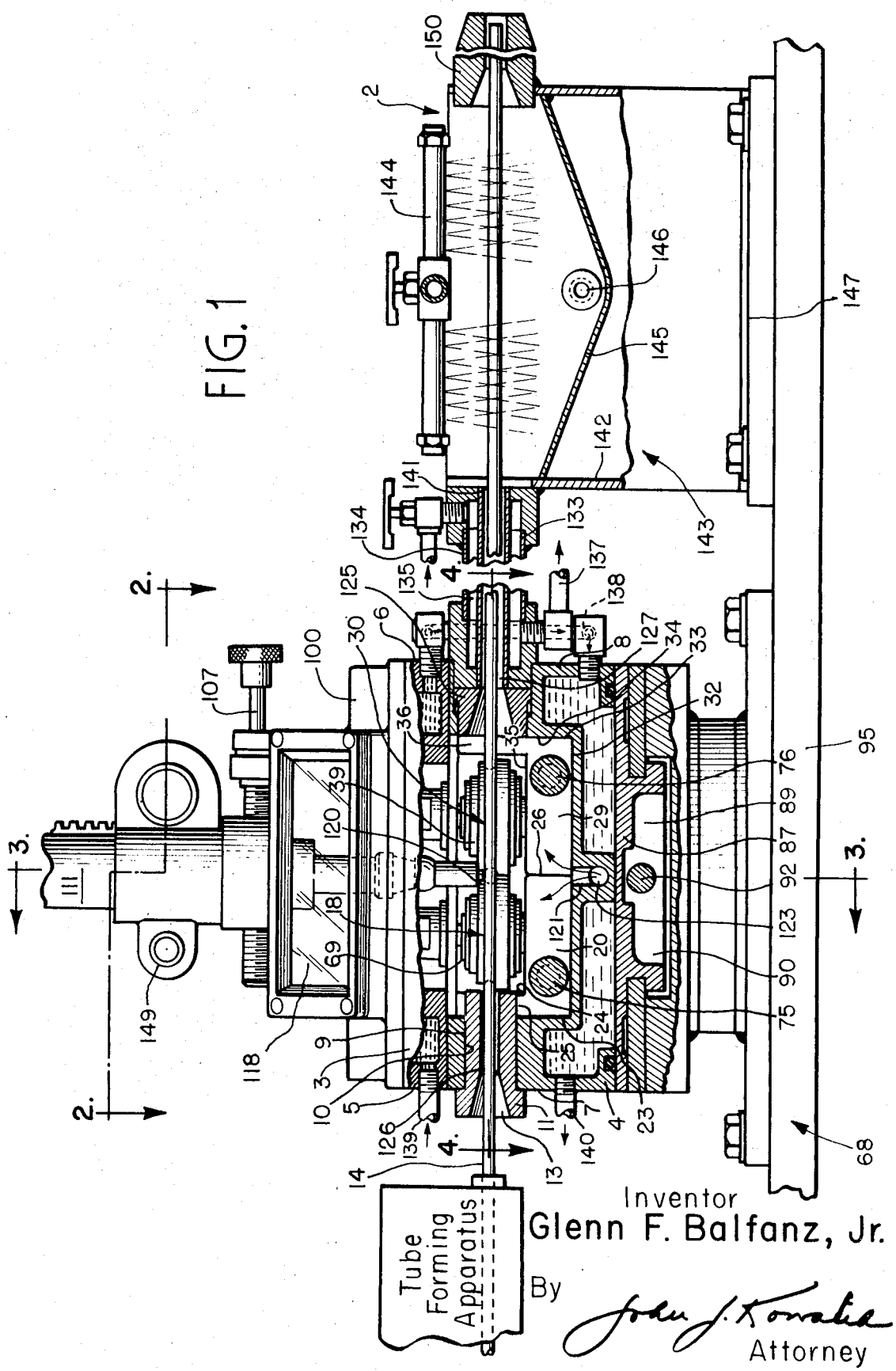
FIG. 1 is a side elevational view of the novel weld box partly in section taken substantially on line 1-1 of FIG. 4.
Figure 2:
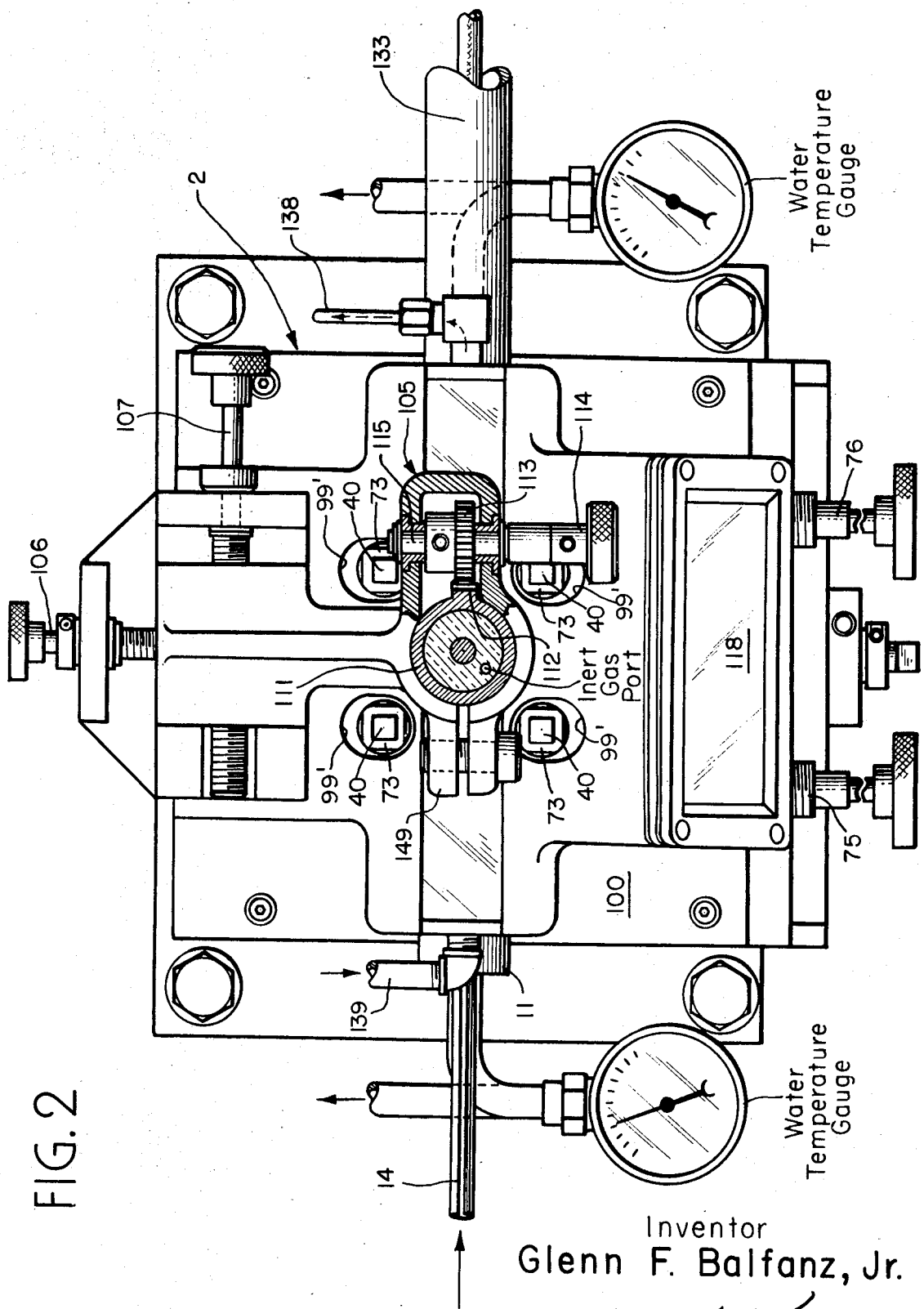
FIG. 2 is a top plan view of the weld box with portions shown in horizontal section taken substantially on line 2-2 of FIG. 1.
Figure 3:
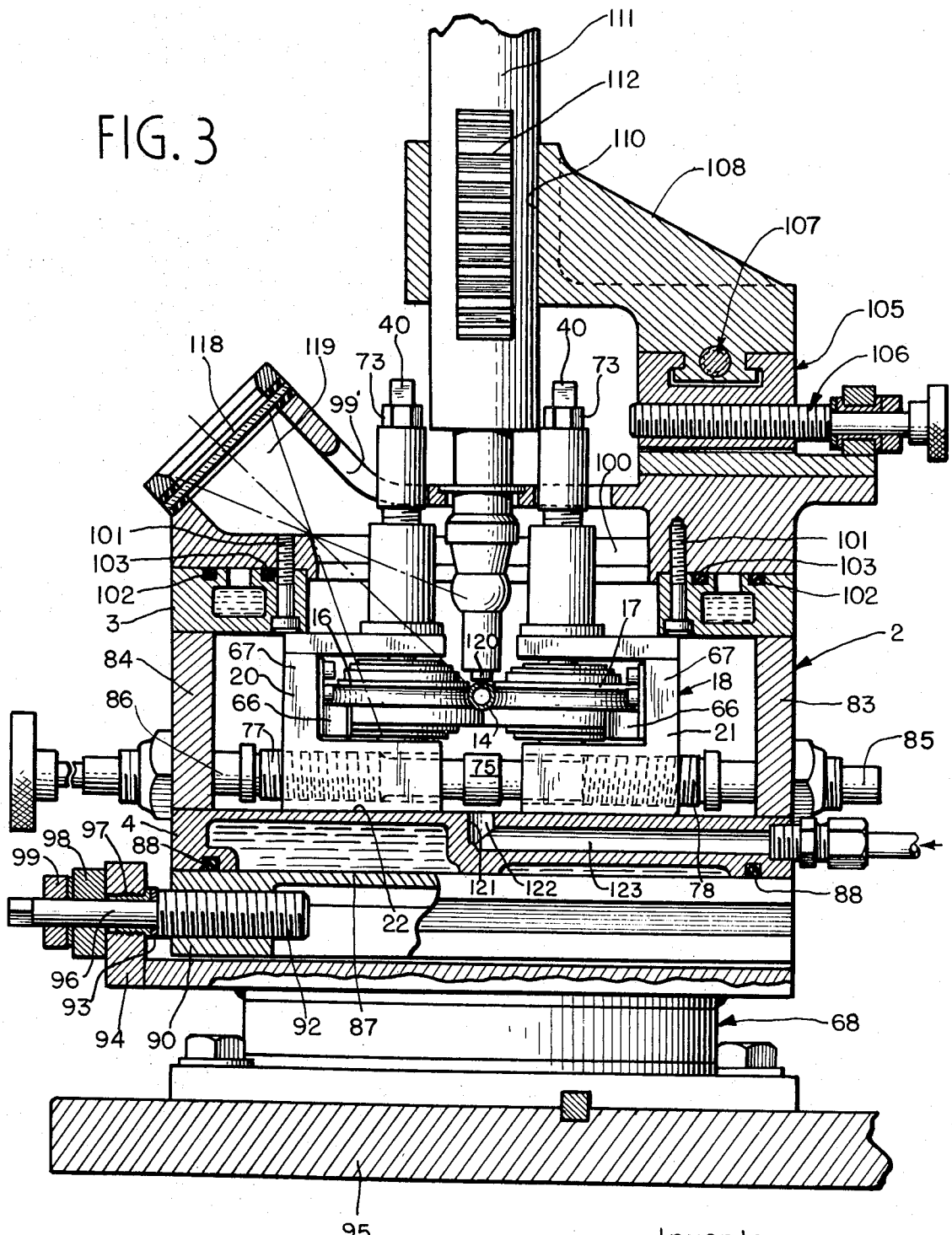
FIG. 3 is a transverse vertical sectional view taken substantially on line 3-3 of FIG. 1.
Figure 4:
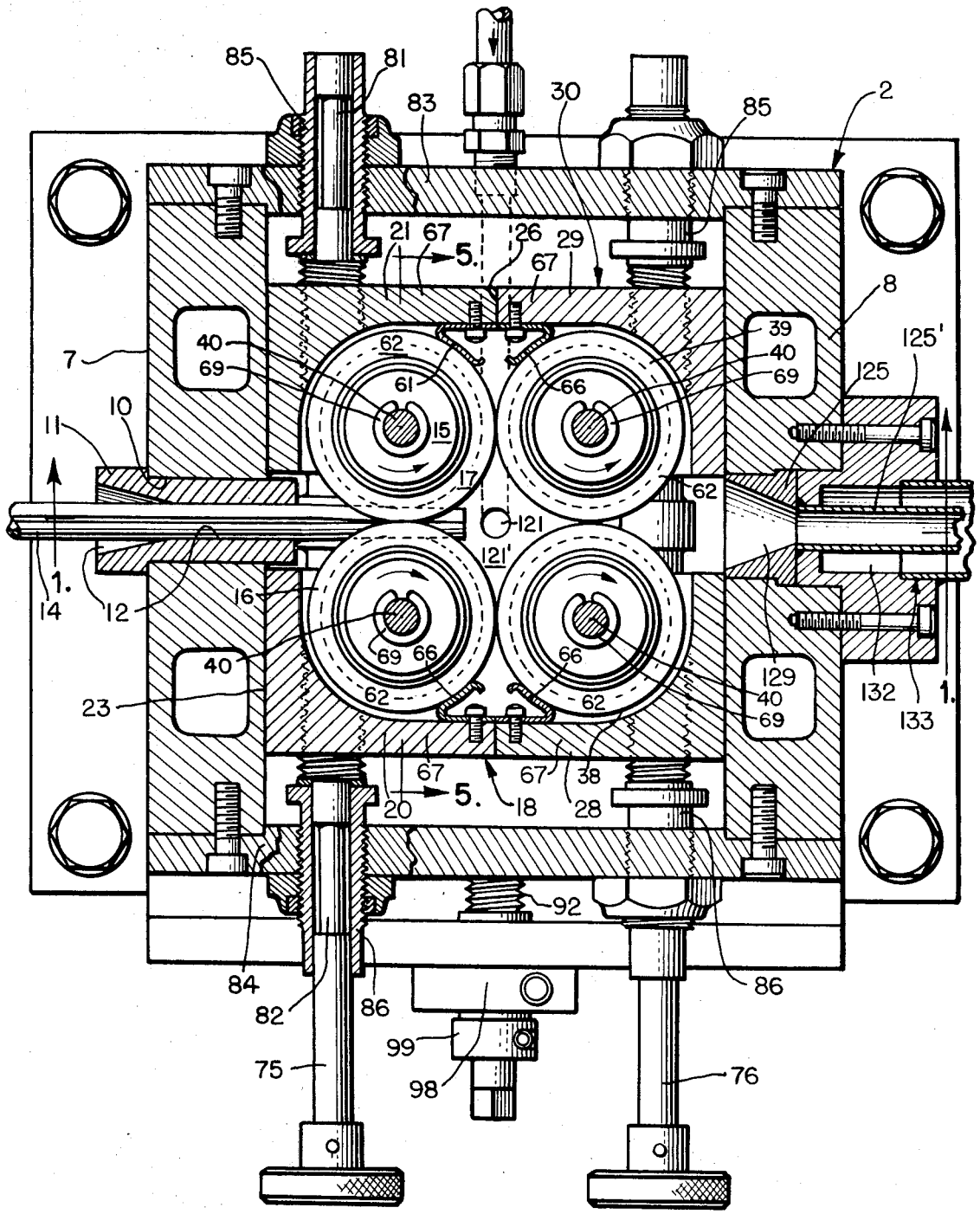
FIG. 4 is a horizontal sectional view taken substantially on line 4-4 of FIG. 1.
Figure 5:
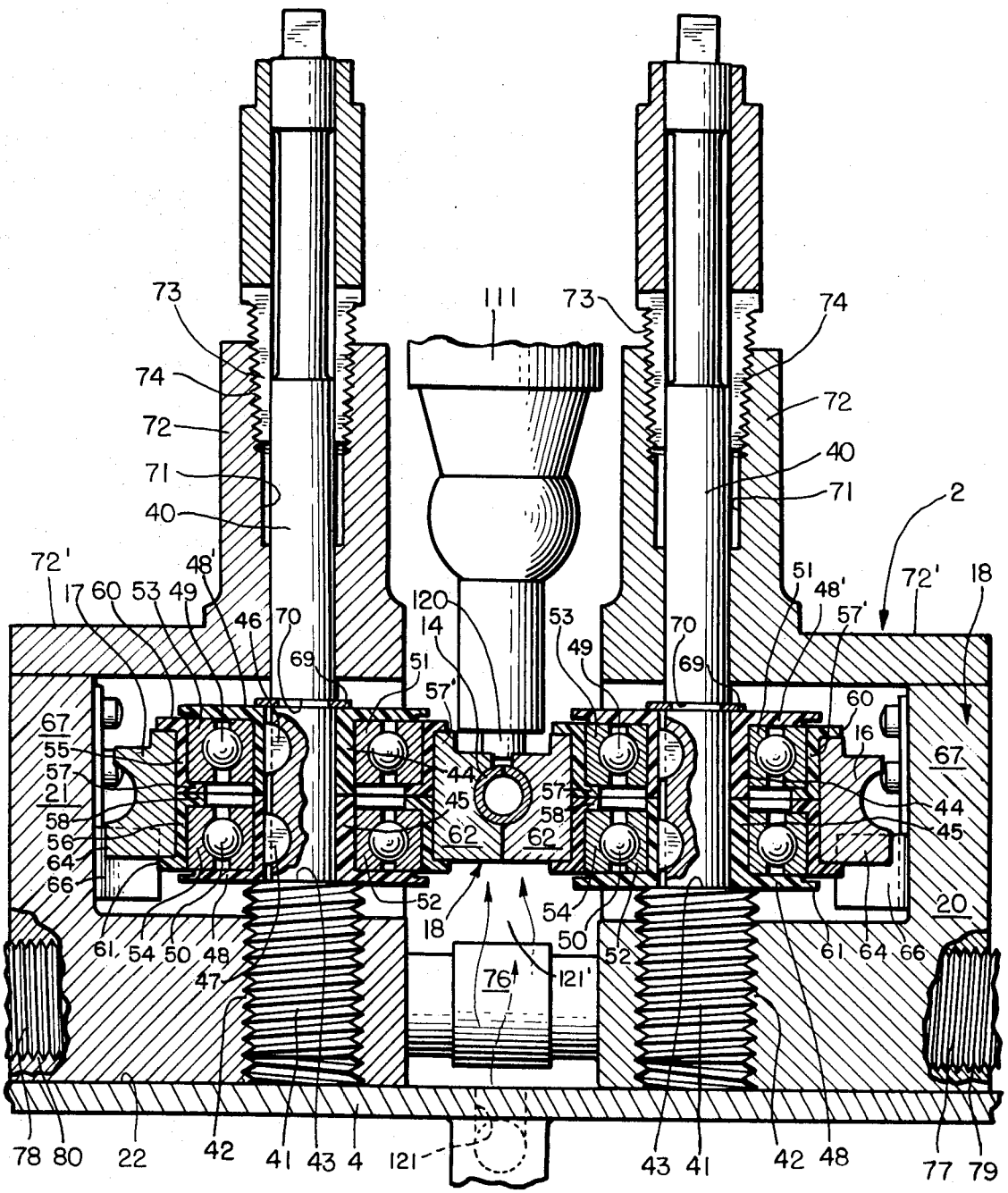
FIG. 5 is a sectional view on line 5-5 of FIG. 4.

The weld box generally designated 2 comprises upper and lower heat exchanger sections 3 and 4. Top section 3 has vertical end portions 5 and 6 which mate with vertical end portions 7 and 8 at respective ends of the bottom section 4.

These end portions form two end walls of the box. The portions 5, 7 have complementary sockets 9 and 10 which snugly pocket a guide sleeve 11 which has a bore 12 with a funnellike inlet 13 for guiding and admitting an unwelded tube 14.

The bore 12 of the guide is horizontally disposed and centered with respect to a nip 15 defined between a pair of opposed horizontally disposed preweld guide rollers 16, 17 of a preweld guide assembly 18. Rollers 16, 17 rotate on vertical axes and are mounted on opposed transversely aligned guide blocks 20, 21. These metal blocks 20, 21 are seated at their bottom flat sides against the top side 22 of the bottom heat exchanger section; at their outer lateral sides 23 are guided against the inner surface of portion 7. The top side 24 of each block 20, 21 fits slidably under an overhang 25 of portion 5.

The inner vertical sides of blocks 18, 19 are slidably engaged at 26 with the inner sides of corresponding blocks 28, 29 of a postweld roller guide assembly 30. The blocks 28, 29 have their bottom sides 32 slidable upon top face 22 of the bottom section 4 and their outer vertical faces 33 are guided against surface 34 on portion 8; and their top surfaces 35 bearing complimentally against the overhang 36 of portion 6.

The blocks 28, 29 support rollers 38, 39 respectively which are rotatable on parallel substantially vertical axes.

Each roller is mounted upon a vertical shaft 40 which has a threaded lower end portion 41 threaded with a complementally threaded bore 42 in the related support block. The lower end threaded portion 41 terminates in a shoulder 43 upon which are supported dielectric upper and lower sleeves 44, 45 which are keyed at 46, 47 to the shaft 40. The lower sleeve 44 has an annular out-turned lower flange 48 and the sleeve 45 is merely reversed and has an upper out-turned annular flange 48[1] and these flanges embrace upper and lower roller bearings 49, 50 which have their inner races 51, 52 fitted upon sleeves 44, 45.

The outer races 53, 54 of bearings 49, 50 fit within dielectric sleeves 55, 56 which are snugly fitted within a bore 57[1] of the related roller and sleeves 55, 56 having inturned flanges 57, 58 which respectively engage the lower and upper edges of outer races 53, 54; the upper and lower ends of sleeves 55, 56 respectively have out-turned flanges 60, 61 which embrace the roller body 62 of the respective roller. Thus the roller bearings are entirely isolated from any current flow which has heretofore caused such bearings to erode.

Each roller has its lower flange 64 brushed at its periphery by an electric contact 66 connected to an upright wall portion 67 of the respective block which shorts any current through the weld box into the ground by way of the base structure 68. The bearing assemblies on each shaft are held against endwise displacement by a snap ring 69 which shoulders against the upper sleeve 44 and snaps into a groove 70 in shaft 40.

Shaft 40 extends upwardly through a bore 71 in a guide sleeve 72 which is formed integral with a support plate 72[1] which is mounted on the upper end of the upright wall 67 of the related block. The shaft 40 is held against rotation by a lock nut 73 which as a lower end split portion threaded into a tapered upper end bore portion 74 in guide sleeve 72. The upper end of the shaft 40 is square to admit on adjusting wrench.

Horizontal adjustment of the pairs of blocks 20, 21 and 28, 29 is accomplished by the adjusting shafts 75, 76 each of which has threaded portions of reverse leads at 77, 78 threaded into complementally threaded bores 79, 80 in blocks 20, 21 and 28, 29 whereby rotation of either shaft 75 or 76 in one direction causes the blocks to spread apart and in the other direction to advance toward each other with the respective rollers thereon.

The end portions 81, 82 of each shaft 75, 76 extend through horizontally aligned bores in the sidewalls 83, 84 of the box and are joined to portions 5, 6, 7 and 8 to form a generally rectangular configuration. These end portions 81, 82 are guided in combined guide and locking assemblies 85, 86 which are mounted in walls 83, 84.

The base wall 87 of the box is connected to the bottom exchanger 4 and sealed by sealing rings 88. Wall 87 has a transverse slot 89 with a lug 90 at one end thereof into which is threaded an adjusting screw 92 which has a shoulder 93 reacting against an anchor lug 94 extending from the base which may be suitably secured to a table 95 of a mill. The reduced portion 96 of the screw 92 extends through guides 97 on lug 94 and locking collars 98, 99 are mounted on the portion 96 to hold the screw 92 in adjusted position.

The upper end portions of the vertical adjusting screws 40 for the rollers project through oval shaped openings 99¹ in a cover plate structure generally designated 100 which is bolted as by bolts 101 against the top heat exchanger 3 and sealed therewith by seals 102, 103. The cover plate structure 100 supports an arm structure 105 which is adjustable transversely of the tube to be welded by an adjusting screw and slide assembly 106. Longitudinal adjustment is accomplished by slide and screw assembly 107 mounted on assembly 105.

An arm 108 is part of assembly 107 and has a vertical bore 110 which admits a welding rod holder 111 which has a vertical rack 112 cooperating with an adjusting gear 113 operated by handle 114 and shaft 115 journaled on arm 108.

The cover structure is provided with a glass-covered viewer 118 at one side of the box with a viewing port 119 disposed at approximately 45° in a line of sight of the weld area generally designated 120.

Immediately below the weld area 120 there is provided a diffuser 121 in section 4 and comprises a port 122 connected to a passage 123 which is connected to a pipe 124 of a supply source of inert gas such as argon, helium, etc. as well known in the art. The gas is chambered at 121¹ below the weld area lengthwise of the tube 14 to continuously engulf it with gas before and after the tube is heated to prevent oxidation.

It will be noted that the inlet and outlet sleeves 11 and 125 comprise axial grooves 126, 127 which communicate respectively with bores 12 and 129 through which the gasses purge into the atmosphere while the tube passes therethrough in order to prevent oxidation.

The sleeve 125' extends through the cooling chamber 132 of a heat exchanger 133 which has a cooling jacket 134 into which the water 135 is ported into one end from any convenient source, the other end of the jacket 134 being connected to an outlet tube 137. The heat exchangers 3 and 4 are interconnected at one end by a crossflow tube 138, the upper exchanger being connected to an inlet 139 and the lower to an outlet 140.

The tube 125' extends through opening 141 in wall 142 to a spray trough 143 through which the welded tube passes under a spray head 144, the water being sprinkled on the tube drops on a trough bottom wall 145 which has an outlet 146 connected to a suitable sump (not shown). The trough has a base 147 which is mounted on the table 95 supporting the weld box and mill. The tube exits through a guide 150 into any suitable storage station (not shown).

Thus what has been described is a novel weld box wherein the tube is engulfed with inert gas and is accurately guided with respect to the weld rod by four guide rollers each of which is adjustable horizontally as well as vertically and wherein the bearings mounting the rollers are isolated from current flow, the tube before welding thus being positively positioned with its seam upwardly in line with the weld rod and after welding being held from distortion and in an inert atmosphere which prevents oxidation and being passed through a cooling chamber and then through a spray before being exposed to the atmosphere. The box is adequately cooled without chilling the tube so as to insure a good weld. If necessary, a preheater could be installed in the box for thicker walled and larger OD tube.

A clamp 149 is provided on arm assembly 108 for holding the rod holder in adjusted position.

In conclusion, the main function of the Controlled Atmosphere Tungsten Inert Gas Weld Station, in stainless steel tube welding, is to control the atmosphere and temperature in the weld zone to obtain proper and clean welds.

I. Temperature Control

Temperature Control is required to prevent:
A. Condensation forming on the exterior of the physical structure.
B. Overheating of the physical structure.
C. Oxidation of the welded tube as it exits from the heat exchanger.
D. Gas shrinkage in the weld area.

It is undesirable to have condensate form on the exterior of the welding station and heat exchanger since this condensate will collect on the steel mill base and cause it to rust. The forming of condensate can be controlled by regulating the water outlet temperature to be equal to room temperature. This will also prevent gas shrinkage which could result in oxidation of the tube due to a depletion of inert gas within weld and cooling zones.

The outlet temperature of water is indicated by thermometers located in the discharge line, and can be controlled by regulating the water volume control valves located on the water inlet line.

Physical damage could result if the physical structure were allowed to overheat, i.e., bearings and shafts could expand and seize becoming inoperative.

The physical material itself could melt if the temperature was allowed to reach the material's melting point. Upper and lower circular water-cooling chambers are provided to cool the box. The centerline of discharge of the cooling water line is at a higher elevation than the centerline of the water inlet to insure that the cooling chambers are always flooded insuring maximum cooling efficiency.

A counterflow heat exchanger is provided on the outlet to the weld station to reduce the temperature of the welded tube from its welding temperature to below its oxidation temperature.

The heat exchanger has its own water circuit which can be controlled independently from that of the weld station. Conditions A & B apply for the heat exchanger as well as the weld station.

II. Atmosphere Control

Atmosphere control within the weld area is required to prevent:
A. Oxidation of the tube weld zone.
B. Usage of excessive amounts of inert gas.

Oxidation of the tube weld zone is prevented by shielding the weld zone with inert gas thereby excluding oxygen and preventing oxidation of the tube weld zone. Inert gas is induced into the welding chamber through the weld torch itself and also through a secondary inert gas inlet located in the bottom of the welding chamber. By inducing inert gas through this secondary inlet, it is possible to reduce the entrance velocity of inert gas from the welding torch. This reduction in gas velocity results in reduced weld splatter generated by the gas stream striking the weld zone or liquid puddle. Gases are liberated by the welding process, the fouled gas is naturally vented by an atmosphere air inlet, located at the entrance of the welding station, and by a fouled gas outlet, located at the end of the heat exchanger.

Usage of excessive amounts of inert gas, which is expensive, is prevented by performing the welding process within a vented enclosure which prevents the inert gas from being dissipated by the atmosphere. Inert gas usage can be reduced up to 30 times the amount used if the welding were to be done in the open atmosphere.

The physical structure of the weld station and heat exchanger is primarily made of brass which has a high rate of heat dissipation and prevents rusting of the cooling chambers.

An adjustment is provided to accurately locate the physical structure (housing) of the weld station, in an axial direction, with respect to the tube centerline in order to eliminate any misalignment which could exert a side trust loading on the tube as it is being welded.

Two sets of pressure rolls are provided within the physical structure (housing) of the weld station. The first set of rolls maintains the proper seam gap as the tube is being welded. The second set of rolls maintains pressure on the tube until the liquid weld puddle has solidified.

Separate lead screw adjustments are provided to move the two pair of roll housings, which contain the pressure rolls, forward and backward with respect to the tube centerline. These lead screws have right- and left-hand threads so that both housings will move forward or backward with respect to each other simultaneously.

Adjustments are provided on the roll shafts so that the centerline of the radius ground in the pressure rolls can be adjusted with respect to each other to eliminate any overturning moment, due to one roll being higher than its mating roll, which can cause the tube to rotate about its centerline. The weld torch is stationary and cannot follow this rotation.

All adjustments can be made while the machine is operating and can be locked in position once the proper adjustment is made.

In the welding process, the weld torch electrode is the negative electrode (cathode) and the tube is the positive electrode (anode). In order to weld the tube, the current must pass through ground, i.e., the electrical circuit must be completed. If the current is allowed to pass through the bearings in the pressure roll, i.e., arc across the bearing races, welding of the rollers in the bearings to the bearing races results in a short period of time.

To prevent this electrical current from arcing across the races of the bearings in the pressure roll, the bearings are completely shrouded by high temperature electrical insulators. The pressure rolls are directly grounded to their roll housings through the use of ground leads, leaf springs which are connected to the roll housings and ride on the exterior of the pressure rolls.

The tube is guided through the weld station by tapered brass tube guides which prevent the tube from becoming jammed as it passes through. This is required in order to eliminate having to remove the top of the weld station in order to free the tube if it were to become jammed.

The pressure rolls are made of a nonmagnetic material to eliminate the possibility of establishing a magnetic field in the weld zone as would be a possibility if magnetic material rolls were to be used. A magnetic field will cause a particle buildup on the weld torch electrode which will periodically drop off into the molten weld puddle causing inclusions in the tube weld zone.

I claim:

1. A weld box for use in closing a seam in seamed tubing, comprising means defining a closed welding chamber within which a welding operation utilizing an inert gas-shielded arc is performed in a defined welding zone in the box to close said seam, means defining aligned openings in opposed walls of said chamber providing a passageway through which a continuous length of said tubing may be moved, means for positioning the seam in said tubing oriented in a predetermined manner in said chamber comprising a complemental preweld pair of guide rollers and a complemental post weld pair of guide rollers, a means for supporting each roller, means for adjusting the position of each supporting means and roller mounted thereon transversely of the tubing, and means adjustably mounting each roller individually on its respective supporting means for bodily movement therewith and for movement relative to its associated supporting means in a direction perpendicular to the movement of the supporting means whereby the rollers may be positioned in radially misaligned relation to each other and in gripping position to the tube and in position to cause said tube to twist about its longitudinal axis for aligning the seam in welding position.

2. The invention according to claim 1 and said means journaling each roller on its associated supporting means comprising bearing means, dielectric means shielding said bearing means to prevent transmission of electric currents therethrough, and means for shunting stray current from the rollers to the ground.

3. In a device of the class described, a weld box having inlet and outlet passages for admitting a tube to be welded therethrough, welding means providing a weld zone for welding the tube, and a gas diffuser having a source of inert gas externally of the box and having a diffuser head disposed immediately beneath said weld zone, said weld zone producing a hot spot in the box causing an upward flow of the atmospheric and shielding gasses in the box and thereby drawing concentrated gasses from said diffuser head therebelow into blanketing proximity to the weld zone.

4. The invention according to claim 3 and an elongated sleeve defining one of said openings comprising an inlet for the tube of approximate diameter thereof and bleed grooves in the sleeve extending from the box interior and intersecting said opening and serving to bleed the gasses within the tube along the length of the tube to minimize entry into the box of atmospheric gasses without the box attendant to movement of the tube into the box.

5. The invention according to claim 1 and one of said openings comprising an outlet, means comprising a sleeve disposed in extension of said outlet, means providing a heat exchange medium about said sleeve for cooling a tube passing therethrough below oxidation temperature, and fluid spray means disposed beyond the last-mentioned means for spraying the tube with a cooling medium.

6. The invention according to claim 1 and means adjustably mounting said box from an associated support for positioning the box laterally to align said openings with the trajectory of the tube from a source of supply.

7. The invention according to claim 1 and means providing a top cover for the box, a weld-rod holder projecting into the box through an opening in said cover, means on the cover providing a support for said holder and adjustable lengthwise of the tube, transverse thereto and vertically thereof to position the rod in accurate alignment with the seam on the tube.

8. The invention according to claim 1 and said box having upper and lower water-cooled heat exchanger sections forming respectively the upper and lower sides of the box, and said supporting means comprising roller blocks being in intimate heat exchange contact with at least said lower section.

9. The invention according to claim 1 and said supporting means comprising blocks arranged to support said preweld pair of rollers and said postweld pair of rollers, and said means for adjusting the blocks comprising a screw for each pair of rollers having reverse lead threads connected to respective blocks of the pair of rollers.

10. The invention according to claim 1 and gas diffuser means and welding means disposed in said box in vertically oriented relationship, and said support means defining a space area therebetween providing a gas-containing chamber beneath the tube for engulfing the tube before and after welding in the inert gas whereby to prevent oxidation and scaling.